United States Patent
Mata et al.

(10) Patent No.: US 9,017,890 B2
(45) Date of Patent: Apr. 28, 2015

(54) ALTERNATIVE PATH COOLING OF A HIGH TEMPERATURE FUEL CELL

(75) Inventors: Marianne E. Mata, Dana Point, CA (US); Tina R. Stoia, Rancho Santa Margarita, CA (US); Chellappa Balan, Niskayuna, NY (US)

(73) Assignee: The Boeing Company, Chicago, IL (US)

( * ) Notice: Subject to any disclaimer, the term of this patent is extended or adjusted under 35 U.S.C. 154(b) by 1323 days.

(21) Appl. No.: 12/401,262

(22) Filed: Mar. 10, 2009

(65) Prior Publication Data

US 2009/0263680 A1    Oct. 22, 2009

Related U.S. Application Data

(60) Provisional application No. 61/046,052, filed on Apr. 18, 2008.

(51) Int. Cl.
 *H01M 8/04* (2006.01)
 *H01M 8/12* (2006.01)

(52) U.S. Cl.
 CPC ...... *H01M 8/04074* (2013.01); *H01M 8/04014* (2013.01); *H01M 8/04111* (2013.01); *H01M 2008/1293* (2013.01); *H01M 2250/20* (2013.01); *H01M 2250/402* (2013.01); *Y02T 90/32* (2013.01); *Y02E 60/50* (2013.01); *Y02B 90/12* (2013.01); *Y02E 60/525* (2013.01)

(58) Field of Classification Search
 USPC ................................................. 429/400–535
 See application file for complete search history.

(56) References Cited

U.S. PATENT DOCUMENTS

| | | | |
|---|---|---|---|
| 5,106,035 A * | 4/1992 | Langford, III | 244/59 |
| 2001/0049040 A1 | 12/2001 | Grune et al. | |
| 2002/0168556 A1* | 11/2002 | Leboe et al. | 429/13 |
| 2003/0011721 A1* | 1/2003 | Wattelet et al. | 349/34 |
| 2003/0205641 A1 | 11/2003 | McElroy et al. | |
| 2006/0237583 A1* | 10/2006 | Fucke et al. | 244/58 |

FOREIGN PATENT DOCUMENTS

DE          196 29 084       1/1998

OTHER PUBLICATIONS

PCT International Search Report and the Written Opinion of the International Search Authority in International Application No. PCT/US2009/037340 dated Jun. 4, 2009; 13 pages.

* cited by examiner

*Primary Examiner* — Muhammad Siddiquee
(74) *Attorney, Agent, or Firm* — Michael J. Baldauff, Jr.; Baldauff IP, LLC

(57) ABSTRACT

Systems and methods provide for the thermal management of a high temperature fuel cell. According to embodiments described herein, a non-reactant coolant is routed into a fuel cell from a compressor or a ram air source. The non-reactant coolant absorbs waste heat from the electrochemical reaction within the fuel cell. The heated coolant is discharged from the fuel cell and is vented to the surrounding environment or directed through a turbine. The energy recouped from the heated coolant by the turbine may be used to drive the compressor or a generator to create additional electricity and increase the efficiency of the fuel cell system. A portion of the heated coolant may be recycled into the non-reactant coolant entering the fuel cell to prevent thermal shock of the fuel cell.

9 Claims, 5 Drawing Sheets

ALTERNATIVE PATH COOLING OF A HIGH TEMPERATURE FUEL CELL

CROSS-REFERENCE TO RELATED APPLICATIONS

This application claims the benefit of U.S. Provisional Patent Application No. 61/046,052, filed on Apr. 18, 2008, and entitled "Alternative Path Cooling of a High Temperature Fuel Cell," which is expressly incorporated herein by reference in its entirety.

BACKGROUND

A fuel cell operates by creating an electrochemical reaction between incoming fuel and oxidizer streams to create electricity. Many fuel cells, such as solid oxide fuel cells (SOFC), operate at high temperatures. Waste heat created by the electrochemical reaction within a fuel cell must be removed to control the temperature of the fuel cell to prevent failure of the cell. A typical thermal management system includes circulating excess reactant, beyond what is needed for the electrochemical reaction, through the fuel cell to absorb heat. However, in certain applications, such as an airborne application in which a fuel cell is utilized on an aircraft, weight is a primary consideration. Storing the excess reactant required to maintain the temperature of the fuel cell can be weight prohibitive.

Gases exiting the fuel cell can be recirculated back to an incoming reactant stream for cooling purposes. However, doing so requires an additional cooling subsystem to cool the recycled flow due to the heat absorbed from the fuel cell. The additional cooling subsystem results in a more complex control system, additional vehicle thermal load, and an increased weight of the overall system. Another conventional thermal management system includes a separate closed system cooling loop for circulating a stored coolant through the fuel cell and through a cooling subsystem. Similar to the other thermal management systems described above, a separate closed system cooling loop adds additional weight and adds complexity with additional pumps, coolant, lines, and power consumption requirements.

It is with respect to these considerations and others that the disclosure made herein is presented.

SUMMARY

It should be appreciated that this Summary is provided to introduce a selection of concepts in a simplified form that are further described below in the Detailed Description. This Summary is not intended to be used to limit the scope of the claimed subject matter.

Systems and methods described herein provide for the cooling of a fuel cell using an ambient coolant, such as air or water depending on the application. According to one aspect of the disclosure provided herein, a coolant that is separate from the reactants is provided to the fuel cell. The coolant flows through the fuel cell to absorb heat before being discharged and directed away from the fuel cell. According to various embodiments, the incoming ambient coolant may be directed through the fuel cell using ram pressure from the movement of the vehicle associated with the fuel cell through the environment, or using a flow control device such as a compressor or pump. Embodiments additionally provide for directing the heated coolant from the fuel cell to a turbine, which in turn may be used to drive a generator for creating additional electricity or to drive the compressor. The heated coolant may also be recirculated into the incoming ambient coolant to increase the temperature of the ambient coolant before it enters the fuel cell to prevent damaging the fuel cell through thermal shock.

The features, functions, and advantages that have been discussed can be achieved independently in various embodiments of the present invention or may be combined in yet other embodiments, further details of which can be seen with reference to the following description and drawings.

DETAILED DESCRIPTION

The following detailed description is directed to systems and methods for controlling the temperature of a fuel cell. As discussed briefly above, fuel cell systems include two input flows, a fuel and an oxidizer. Typical thermal management systems utilize excess reactant flow and/or separate closed system cooling loops to control the temperature of the corresponding fuel cell. These systems are not always optimal when the fuel cell operates in a vehicle or platform having stringent weight, space, and power constraints.

Throughout this disclosure, for illustrative purposes, the various embodiments will be described with respect to the operation of a high temperature fuel cell, such as a SOFC, used to create electrical power for an aircraft or aircraft subsystem. However, it should be understood that the disclosure provided herein is equally applicable to any type of fuel cell used in any application in which an ambient flow of coolant is readily available. As an example of "coolant" as disclosed herein, aircraft and vehicles propel themselves through the surrounding air, creating an ambient airflow that may be used as a coolant according to the various embodiments described herein. Similarly, vessels such as ships and submarines propel themselves through the surrounding water, creating an ambient water flow that may be used as the coolant described below with respect to various embodiments. Accordingly, the flow of the "ambient coolant" and "coolant" described herein applies to the flow of any fluid, and according to various embodiments, to the fluid within the environment surrounding the platform containing the fuel cell to be cooled. The flow of the "ambient coolant" also applies towards stationary systems where the coolant flow is driven into the system.

Utilizing the concepts and technologies described herein, a high temperature fuel cell system may be operated in a manner that allows for thermal control of the fuel cell stack, utilizing a coolant stream that is separate from the reactant streams flowing into the fuel cell. Once heated by an exchange of heat within the fuel cell, the heated coolant may be utilized to create additional electricity and/or drive further system components as described below. Because the separate coolant stream is input to the fuel cell system from the ambient environment rather than storage, and because the output coolant containing the waste heat from the fuel cell may be utilized to drive system components and create additional power, the embodiments disclosed herein provide for an efficient, weight-effective thermal management system.

Figure 1:
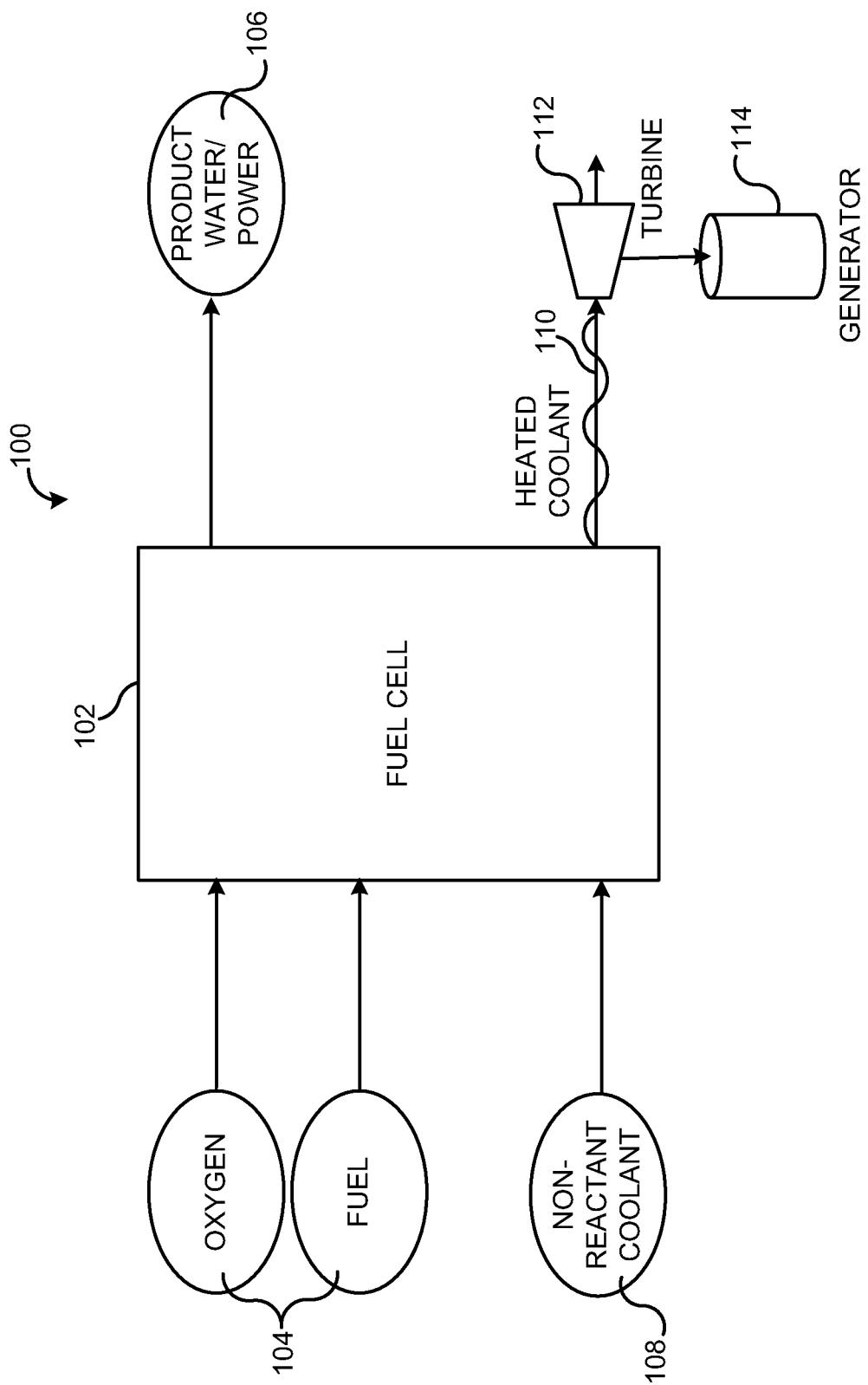
FIG. 1 is a block diagram showing a fuel cell cooling system according to various embodiments presented herein.

In the following detailed description, references are made to the accompanying drawings that form a part hereof, and which are shown by way of illustration, specific embodiments, or examples. Referring now to the drawings, in which like numerals represent like elements through the several figures, thermal management of a high temperature fuel cell cooling system will be described. FIG. 1 shows a high temperature fuel cell cooling system 100 according to one embodiment described herein. The high temperature fuel cell cooling system 100 includes a fuel cell 102 that is operative to create products 106, such as water and electricity, from an electrochemical reaction of the reactants 104, which include oxygen and a fuel.

A non-reactant coolant 108 is routed to the fuel cell 102. According to one embodiment, the non-reactant coolant 108 includes ram air captured by the high temperature fuel cell cooling system 100 from ambient air rushing past the vehicle containing the high temperature fuel cell cooling system 100. A coolant supply mechanism for supplying the ram air to the fuel cell 102 may include ducting and any other components that capture the ambient airflow and transport it into and through the fuel cell 102. An example of an alternative coolant supply mechanism will be described below with respect to FIG. 2.

Within the fuel cell 102, the ambient air can be routed throughout the fuel cell via ducts, conduit, apertures, or other channels to absorb waste heat from the electrochemical reaction inside. In this manner, the fuel cell 102, or portions of the fuel cell that thermally contact the non-reactant coolant 108, operates as a heat exchanger, transferring heat from the higher temperature fuel cell to the lower temperature non-reactant coolant 108. The heated coolant 110 containing the non-reactant coolant 108 saturated with waste heat is discharged from the fuel cell 102.

The high temperature fuel cell cooling system 100 may include a heat disposal mechanism that receives the heated coolant 110 from the fuel cell 102 and disposes or otherwise utilizes it. The heated coolant 110 may be utilized in any number and combination of ways according to various embodiments described herein. First, the heat disposal mechanism may simply include ducting and components for venting the heated coolant 110 to the ambient environment. For example, ram air that is forced through the fuel cell 102 may be discharged to the atmosphere.

An alternative heat disposal mechanism may include a turbine 112, as shown in FIG. 1. The turbine 112 may be coupled to a generator 114. In this embodiment, the heated coolant 110 drives the turbine 112, which in turn drives the generator 114 to create electricity. The generator 114 can provide power to an aircraft system in addition to the power created by the electrochemical reaction within the fuel cell 102. Heated coolant 110 leaving the turbine 112 may be vented to the ambient environment. The heat disposal mechanism may additionally include a recirculation device 302, which will be described in detail below with respect to FIG. 3.

Figure 2:
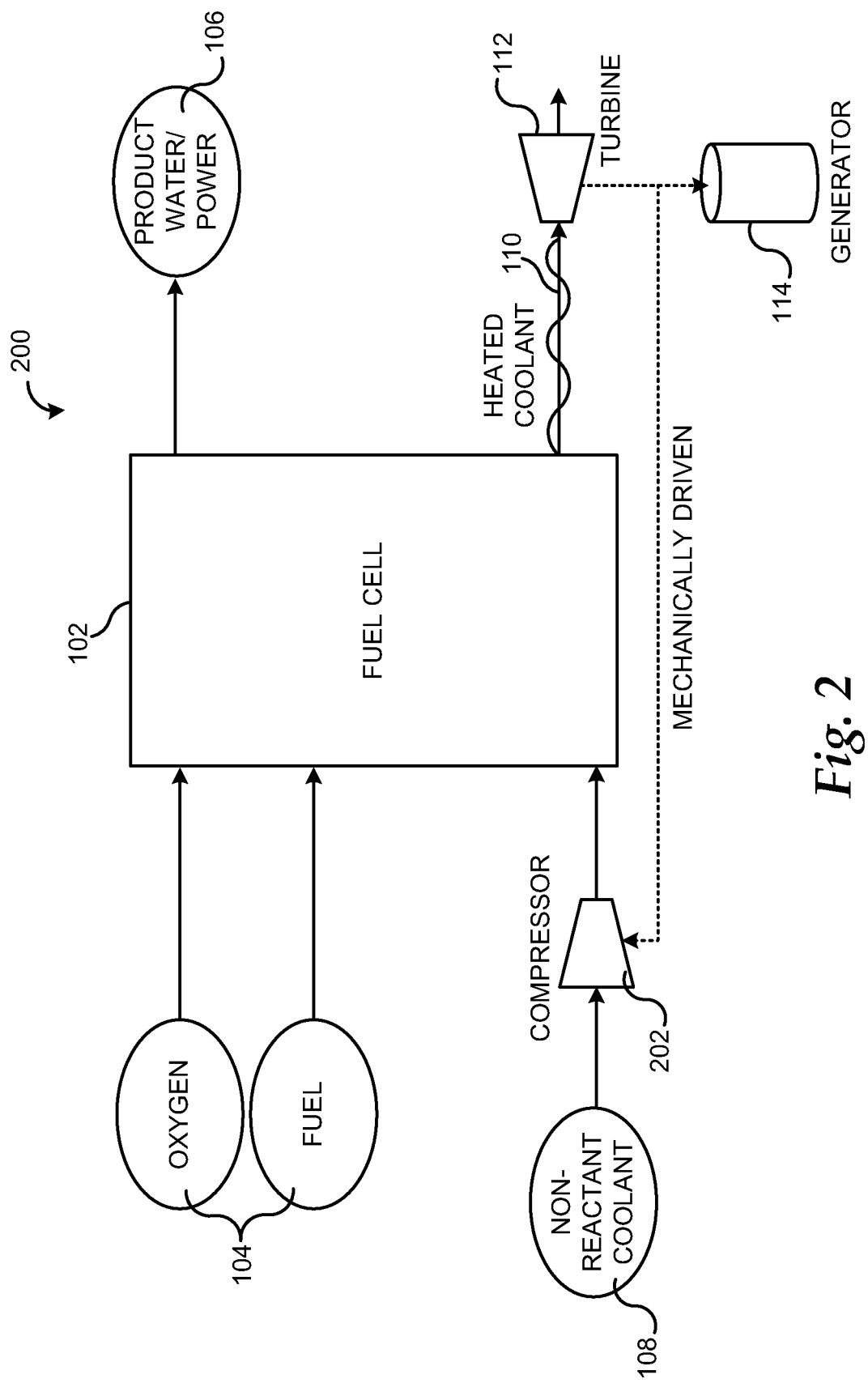
FIG. 2 is a block diagram showing a fuel cell cooling system that utilizes a turbine-driven compressor according to various embodiments presented herein.

FIG. 2 shows an alternative high temperature fuel cell cooling system 200 that utilizes an alternative coolant supply mechanism. Specifically, the alternative coolant supply mechanism includes a compressor 202 for supplying the non-reactant coolant 108 to the fuel cell 102. According to this embodiment, ram air is not utilized to cool the fuel cell 102. Rather, low pressure, non-reactant ambient airflow is routed to the compressor 202, which provides some pressurization of the non-reactant coolant 108 to supply it to the fuel cell 102. As an example, in a regenerative high altitude aircraft power system, oxygen and hydrogen are both stored under pressure. However, since the cooling air stream is not reactive, it would not be necessary to highly pressurize the stream. As a result, the compressor 202 may utilize a single stage system without any interstage cooling.

Further according to this embodiment, the turbine 112 of the heat disposal mechanism described above for managing the heated coolant 110 from the fuel cell 102 is used to mechanically drive the compressor 202. The compressor may also be driven by other means such as an alternative electrical source or from the generator (114). It should be understood that the turbine 112 and the generator 114 may be utilized to mechanically or electrically drive any number and type of desired platform components within the scope of this disclosure, provided that the characteristics of the heated coolant 110 allow for the desired turbine 112 and generator 114 output.

Figure 3:
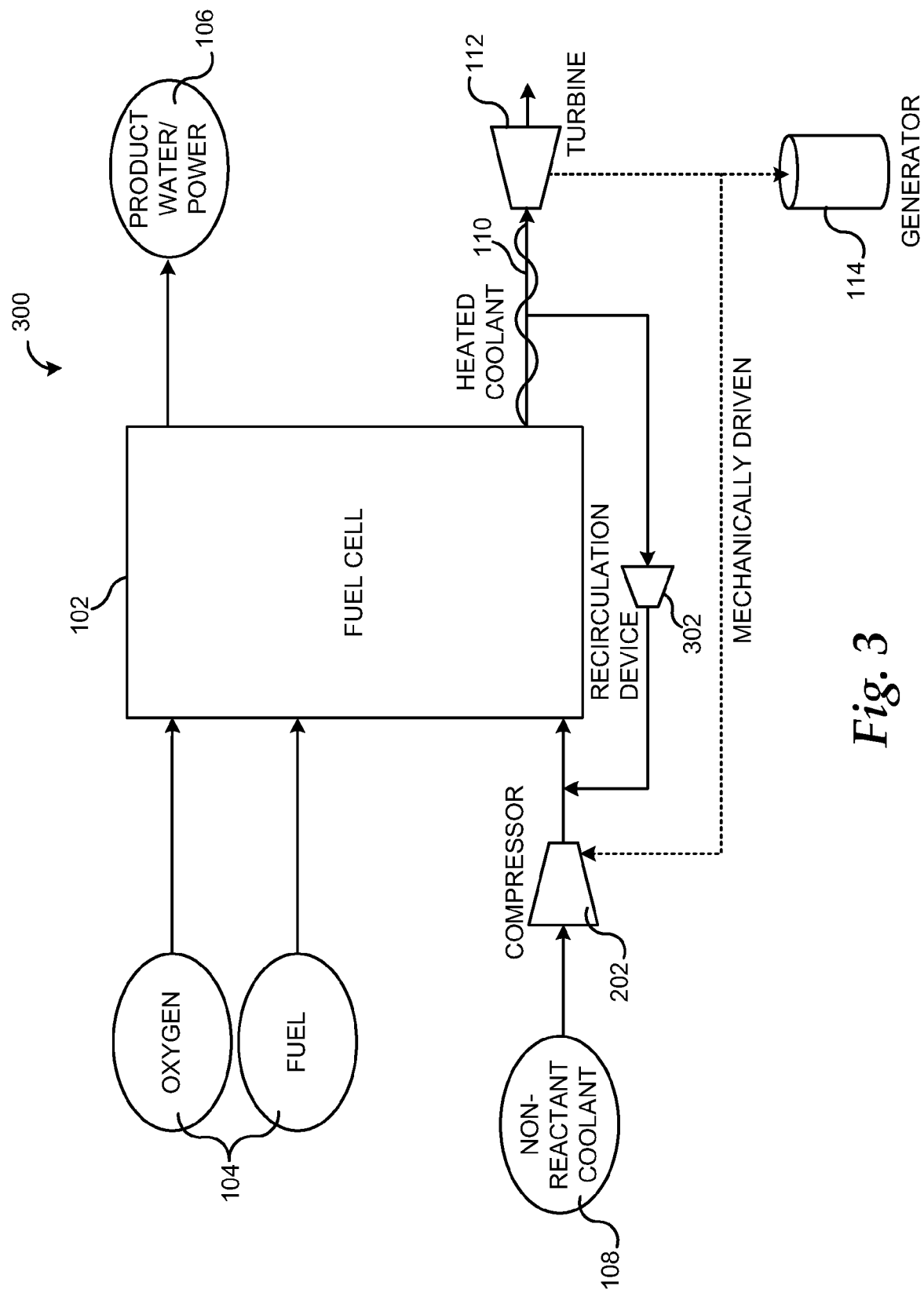
FIG. 3 is a block diagram showing a fuel cell cooling system that utilizes recirculated coolant to increase the temperature of the ambient coolant entering the fuel cell according to various embodiments presented herein.

Looking at FIG. 3, yet another alternative high temperature fuel cell cooling system 300 includes a recirculation device 302 to route a portion of the heated coolant 110 back into the non-reactant coolant 108 flowing into the fuel cell 102. The recirculation device 302 may include a fan or ejector that is operative to supply the heated coolant 110 to the non-reactant coolant 108 stream entering the fuel cell. Because of the significant temperature differential that may be present between the ambient coolant exiting the compressor 202 and the fuel cell 102, there may be a high potential for damage to the fuel cell 102 due to thermal shock that would occur from utilizing a non-reactant coolant 108 that is significantly cooler than the fuel cell 102 reaction. As a result, embodiments described herein provide for the heating of the non-reactant coolant 108 stream to a temperature higher than the temperature of the non-reactant coolant 108 exiting the compressor 202, but lower than that of the fuel cell 102.

According to various embodiments, heating the non-reactant coolant 108 with the heated coolant 110 upstream from the fuel cell 102 may occur through an actual mixing of the two flows or via thermal contact between the two flows without commingling the non-reactant coolant 108 and the heated coolant 110. To transfer heat from the heated coolant 110 to the non-reactant coolant 108 without commingling the two flows, a recuperator, or heat exchanger, may be used. An implementation utilizing a recuperator will be described with respect to FIG. 4.

Figure 4:
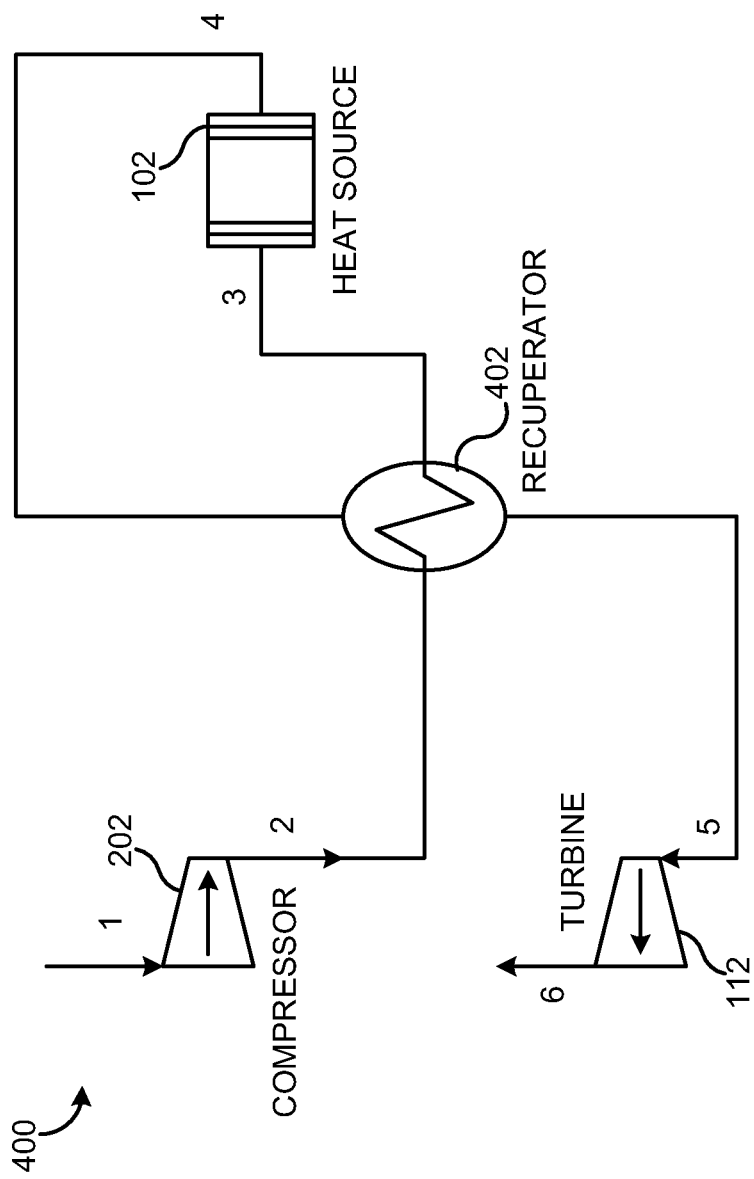
FIG. 4 is a schematic diagram showing the flow of coolant through a fuel cell cooling system to illustrate heat transfers at various stages within the system according to various embodiments presented herein.

FIG. 4 illustrates the path of coolant flow through a high temperature fuel cell cooling system 400. Various heat transfers at different stages within the system will now be discussed using illustrative temperature values. It should be understood that the temperature values described are for illustration purposes only. The actual temperature differentials between the various stages of the high temperature fuel cell cooling system 400 will depend on any number of factors, including but not limited to the operating characteristics of the fuel cell 102, the heat capacity of the non-reactant coolant 108, the flow rates of the non-reactant coolant 108 throughout the system, the operational specifications of the compressor 202 and the turbine 112, and the characteristics of the recuperator 402, among others.

At stage 1, the non-reactant coolant 108 enters the compressor 202 at −51 C as an ambient airflow from outside of an aircraft at altitude. The non-reactant coolant 108 heats as it is pressurized by the compressor, exiting the compressor 202 at 84 C at stage 2. From stage 2, the non-reactant coolant 108 enters the recuperator 402. As described above, the recuperator 402 is a heat exchanger that transfers heat from heated coolant 110 from the fuel cell 102 to the non-reactant coolant 108 entering the fuel cell 102 in an effort to prevent thermal shock from damaging the fuel cell 102 as a result of an excessive temperature differential between the non-reactant coolant 108 entering the fuel cell 102 and the heat within the fuel cell 102. After heating the non-reactant coolant 108 within the recuperator 402, the non-reactant coolant 108 exits the recuperator 402 and enters the fuel cell 102 at 625 C at stage 3.

The non-reactant coolant 108 absorbs further heat within the fuel cell 102, becoming heated coolant 110. The heated coolant 110 exits the fuel cell 102 and re-enters the recuperator 402 at 800 C at stage 4. The heated coolant 110 is used to heat the non-reactant coolant 108 within the recuperator 402. The heated coolant 110 exits the recuperator 402 and enters the turbine 112 at 246 C at stage 5. The heated coolant is further cooled through the turbine 112, and exits the turbine 112 at 110 C at stage 6.

Figure 5:
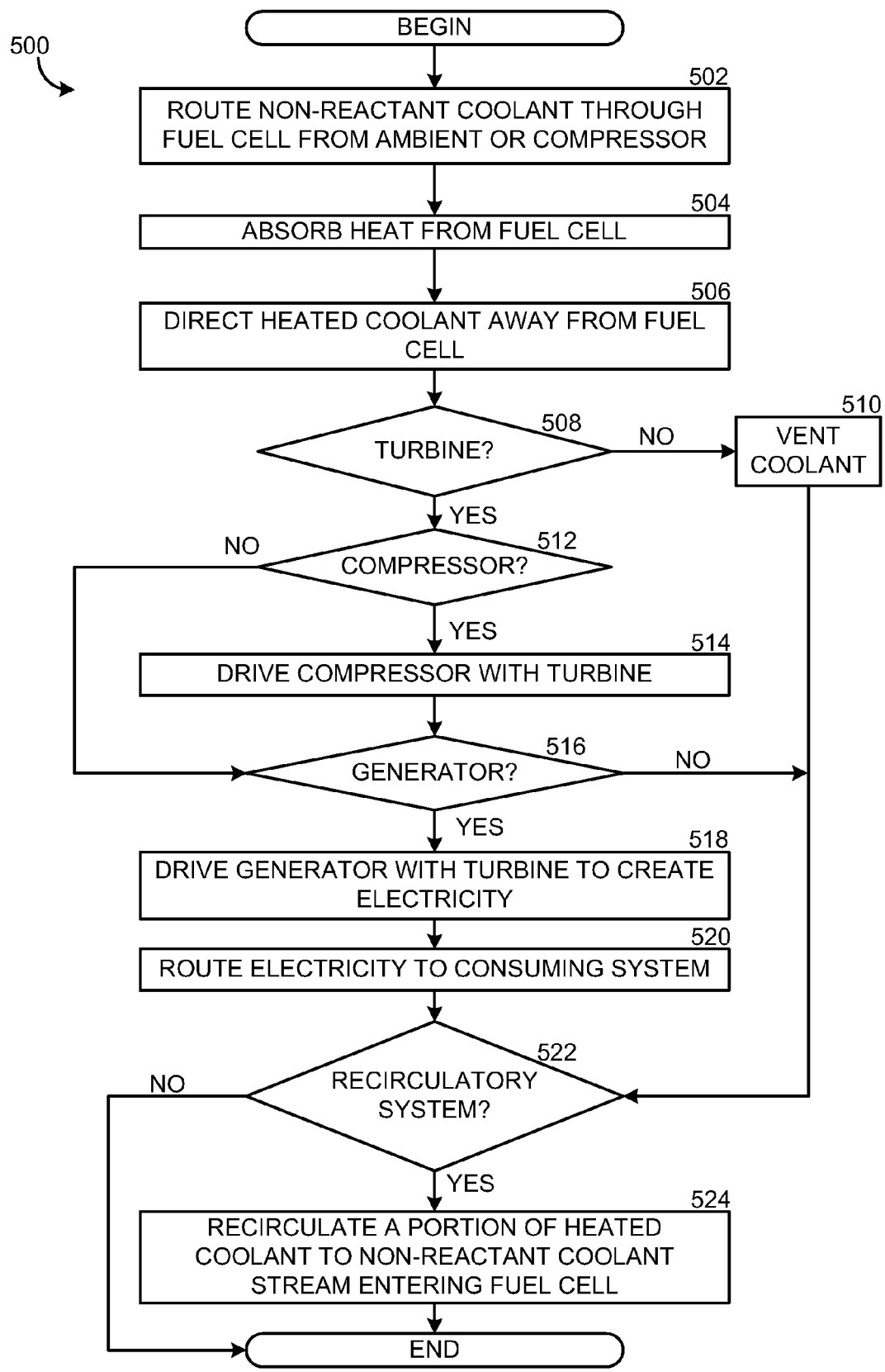
FIG. 5 is a flow diagram illustrating a method for controlling the temperature of a high temperature fuel cell according to various embodiments presented herein.

Turning now to FIG. 5, an illustrative routine 500 for managing the temperature of a high temperature fuel cell 102 will now be described in detail. It should be appreciated that more or fewer operations may be performed than shown in the FIG. 5 and described herein. Moreover, these operations may also be performed in a different order than those described herein. The routine 500 begins at operation 502, where the non-reactant coolant 108 is routed through the fuel cell 102. As described above, the non-reactant coolant 108 may be driven through the fuel cell 102 as ram air or using the compressor 202. At operation 504, heat from the fuel cell 102 is transferred to the lower temperature non-reactant coolant 108, creating the heated coolant 110. The heated coolant 110 is directed away from the fuel cell 102 at operation 506.

If the high temperature fuel cell cooling system 300 does not include a turbine 112 as part of a heat disposal mechanism at operation 508, then the routine 500 proceeds to operation 510, where the heated coolant 110 is vented to the environment or partially recirculated if the high temperature fuel cell cooling system includes a recirculatory system at operation 522 as described below. However, if the high temperature fuel cell cooling system 100 includes a turbine 112, then the routine 500 continues from operation 508 to operation 512. If a compressor 202 is present within the high temperature fuel cell cooling system 300 and utilized to provide the non-reactant coolant 108 to the fuel cell 102, then the routine 500 continues through operation 512 to operation 514, where the compressor is driven with the turbine 112. However, if the non-reactant coolant 108 is provided to the fuel cell 102 directly as ram air, then the routine 500 proceeds from operation 512 to operation 516.

If a generator 114 is not present within the high temperature fuel cell cooling system 300 at operation 516, then the routine 500 proceeds to operation 522 and continues as described below. However, if a generator 114 is to be utilized within the high temperature fuel cell cooling system 300, then the routine continues to operation 518, where the turbine 112 is used to drive the generator 114 to create electricity. At operation 520, the electricity is routed to one or more systems associated with the platform on which the high temperature fuel cell cooling system 300 is being utilized. By utilizing the heated coolant 110 to generate electricity in addition to the electricity generated by the fuel cell 102 electrochemical reaction as described herein, the efficiency of the entire fuel cell system is increased.

If the high temperature fuel cell cooling system 300 does not include a recirculatory system for recycling heated coolant 110 back into the non-reactant coolant 108 stream at operation 522, then the routine 500 ends. However, if the high temperature fuel cell cooling system 300 includes a recirculation device 302, then the routine 500 continues from operation 522 to operation 524, where a portion of the heated coolant 110 is recirculated to the non-reactant coolant 108 stream entering the fuel cell 102. As described above, recirculation flow of the heated coolant 110 may be located earlier on in the flow system, such as before the turbine 112. The heated coolant 110 is used to increase the temperature of the non-reactant coolant 108 stream so that thermal shock of the fuel cell 102 is prevented. The recuperator 402 may be used as described above to enable the heat transfer from the heated coolant 110 to the non-reactant coolant 108.

It should be clear from the various embodiments described above that the disclosure provided herein provides a weight-efficient process for managing the temperature of a high temperature fuel cell. By utilizing a non-reactant ambient air or water flow to cool the fuel cell 102, storing excess reactants 104 used for cooling purposes and providing separate closed system cooling loops can be avoided. Moreover, the high temperature fuel cell cooling system 300 described above provides flexibility to tailor the system according to the specific application parameters. For example, the non-reactant coolant 108 may be provided via ram air or a compressor depending on the platform operational parameters. Similarly, a turbine 112 may be added to the high temperature fuel cell cooling system 300 to recapture some of the energy within the heated coolant 110, which can then be used to drive the compressor 202 and/or to generate additional electricity using the generator 114, increasing the overall efficiency of the fuel cell system.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A system for thermal management of a fuel cell, the system comprising:
   a first reactant supply mechanism closed to an ambient environment and configured to store and supply oxygen to the fuel cell for a fuel cell reaction;
   a second reactant supply mechanism closed to the ambient environment and configured to store and supply fuel to the fuel cell for the fuel cell reaction; and
   a coolant supply mechanism coupled to the ambient environment and isolated from the first reactant supply mechanism and from the second reactant supply mechanism comprising an inlet defining a channel through which a non-reactant ambient airflow is captured from an ambient environment, the coolant supply mechanism operative to provide an entire portion of the non-reactant ambient airflow captured through the channel from the ambient environment to the fuel cell;
   a heat exchanger within the fuel cell configured to receive the entire portion of the non-reactant ambient airflow captured through the channel from the ambient environment from the coolant supply mechanism, route the entire portion of the non-reactant ambient airflow through a portion of the fuel cell to absorb heat from the fuel cell to create heated coolant, and discharge the heated coolant from the fuel cell; and a heat disposal mechanism configured to receive the heated coolant discharged from the heat exchanger and direct the heated coolant away from the fuel cell.

2. The system of claim 1, wherein the non-reactant ambient airflow comprises ram air, and wherein the heat exchanger comprises a conduit for routing the ram air through the portion of the fuel cell to absorb heat from the fuel cell.

3. The system of claim 1, wherein the coolant supply mechanism comprises a compressor configured to pressurize the non-reactant ambient airflow and to direct the non-reactant ambient airflow to the heat exchanger.

4. The system of claim 1, wherein the heat disposal mechanism comprises a turbine configured to create mechanical energy from a flow of the heated coolant discharged from the heat exchanger.

5. The system of claim 4, wherein the turbine is coupled to a generator, enabling production of electricity from the mechanical energy created from the flow of the heated coolant.

6. The system of claim 4, wherein the coolant supply mechanism comprises a compressor configured to pressurize the non-reactant ambient airflow and to direct the non-reactant ambient airflow to the heat exchanger, and wherein the turbine is further configured to drive the compressor.

7. The system of claim 1, wherein the heat disposal mechanism comprises an outlet configured to vent the heated coolant to an ambient environment.

8. The system of claim 1, wherein the heat disposal mechanism comprises a recirculation device operative to combine a portion of the heated coolant with the non-reactant ambient airflow to increase a temperature of the non-reactant ambient airflow and decrease a temperature differential between the non-reactant ambient airflow and the heat from the fuel cell.

9. The system of claim 1, wherein the fuel cell comprises a solid oxide fuel cell that provides power to an aircraft system, wherein the non-reactant ambient airflow comprises ram air, wherein the heated coolant comprises heated ram air, and wherein the heat disposal mechanism comprises a turbine configured to create mechanical energy from a flow of the heated ram air discharged from the heat exchanger.

\* \* \* \* \*